United States Patent
Brenhouse et al.

(10) Patent No.: US 10,438,280 B2
(45) Date of Patent: Oct. 8, 2019

(54) AUCTION BID NOTIFICATION VIA A WEARABLE DEVICE

(71) Applicants: Douglas A. Brenhouse, Belmont, MA (US); Jeremy J. Paradise, Boston, MA (US); Andrew Kwasik, Boston, MA (US); Nicholas Waynik, Boston, MA (US)

(72) Inventors: Douglas A. Brenhouse, Belmont, MA (US); Jeremy J. Paradise, Boston, MA (US); Andrew Kwasik, Boston, MA (US); Nicholas Waynik, Boston, MA (US)

(73) Assignee: Auction Mobility LLC, Boston, MA (US)

( * ) Notice: Subject to any disclaimer, the term of this patent is extended or adjusted under 35 U.S.C. 154(b) by 646 days.

(21) Appl. No.: 15/139,611

(22) Filed: Apr. 27, 2016

(65) Prior Publication Data
US 2017/0316495 A1    Nov. 2, 2017

(51) Int. Cl.
*G06Q 30/00*    (2012.01)
*G06Q 30/08*    (2012.01)
*H04M 19/04*    (2006.01)
*H04M 1/725*    (2006.01)

(52) U.S. Cl.
CPC .......... *G06Q 30/08* (2013.01); *H04M 1/7253* (2013.01); *H04M 19/047* (2013.01)

(58) Field of Classification Search
None
See application file for complete search history.

(56) References Cited

U.S. PATENT DOCUMENTS

| | | | | |
|---|---|---|---|---|
| 2007/0203734 A1* | 8/2007 | Whelchel | ............... | G06Q 30/00 705/26.1 |
| 2015/0294312 A1* | 10/2015 | Kendrick | ............... | G06Q 20/40 705/44 |
| 2016/0350843 A1* | 12/2016 | Green | ................... | G06Q 30/08 |

OTHER PUBLICATIONS

Kerschberg, "How Auction Mobility and Its Partners Are Disrupting the Auction IndustryWith Smart Mobile Tech," Forbes.com, Sep. 22, 2015. <http://www.forbes.com/sites/benkerschberg/2015/09/22/how-auction-mobility-and-its-partners-are-disrupting-the-auction-industry-with-smart-mobile-tech/#7ce6f69d3af0>.

\* cited by examiner

*Primary Examiner* — Mila Airapetian
(74) *Attorney, Agent, or Firm* — Mintz Levin Cohn Ferris Glovsky and Popeo, P.C.

(57) ABSTRACT

Systems and methods are provided for auction bid notifications via wearable devices. In general, an auction system can be configured to provide an auctioneer of a live auction with a haptic notification of a bid having been made. In an exemplary embodiment, the haptic notification can be provided to an auctioneer via a wearable device worn by the auctioneer. In at least some embodiments, the haptic notification can be provided to an auctioneer in addition to one or both of a visual notification and an auditory notification indicative of the bid having been made.

21 Claims, 5 Drawing Sheets

AUCTION BID NOTIFICATION VIA A WEARABLE DEVICE

FIELD

The present disclosure relates generally to auction bid notification via a wearable device.

BACKGROUND

Auction houses providing live auctions traditionally allow bidders to place live auction bids either in person or from remote locations, such as by telephone. Thus, in order to ensure consideration of the current highest bid, an auctioneer of a live auction must be aware of both incoming bids made by bidders who are on site with the auctioneer and incoming bids made by remote bidders who are off site from the auctioneer. The auctioneer can visually see and/or audibly hear bidders making onsite bids to ensure consideration of the bids. Conversely, the auctioneer cannot visually see or audibly hear offsite bidders making bids and must be made of aware of these offsite bids in some way other than visual and/or audible observation of the bidders. This notification of offsite bids traditionally involves a visual cue provided to the auctioneer, such as on a display screen visible to the auctioneer. However, in order to view the screen to scan for offsite bids, the auctioneer must repeatedly divert his/her attention from live bidders throughout the auctioning of every auction lot. Such repeated diversions of attention can be tiring for auctioneers and/or can result in lags of bidding acknowledgment while the auctioneer's attention is primarily devoted at any given moment to only one of onsite bidders and offsite bidders.

Accordingly, a need exists for improved auction bid notifications.

SUMMARY

Auction bid notifications via wearable devices are provided.

In one aspect, an auction system is provided that in one embodiment includes a first client terminal and a second client terminal. The first client terminal is associated with a bidder and includes a first display, a first memory storing first instructions, and a first processor. The first processor is configured to execute the stored first instructions to cause first information regarding an auction lot available for live auction bidding to be shown on the first display, and receive a first signal indicative of a first input by a user to the first client terminal. The first input is indicative of the user entering a bid for the auction lot. The second client terminal is associated with an auctioneer and is configured to provide a haptic signal. The first processor is configured to, in response to the receipt of the first input, cause a second signal to be transmitted to the second client terminal. The second client terminal is configured to, in response to receipt of the second signal, provide the haptic signal to the auctioneer to indicate that the bid has been submitted for the auction lot.

The system can vary in any number of ways. For example, the second client terminal can receive the second signal, can provide the haptic signal to the auctioneer, and can be configured to be worn by the auctioneer. For another example, the system can include a third client terminal associated with the auctioneer, the third client terminal can be configured to receive the second signal and, in response to the receipt of the second signal at the third client terminal, to cause the second client terminal to provide the haptic signal to the auctioneer, and the second client terminal can be configured to be worn by the auctioneer. For yet another example, the haptic signal can include at least one a vibration and an electronic tap. For still another example, the second client terminal can be configured to, in response to receipt of the second signal, cause at least one of an audible signal and a visible signal to be provided to the auctioneer to provide additional signaling to the auctioneer that the bid has been submitted for the auction lot. For another example, the first client terminal can include an input/output device configured to receive the first input thereto. For yet another example, the first client terminal can include a first network interface configured to facilitate electronic communication over a network, and the second client terminal can include a second network interface configured to facilitate electronic communication over the network. For another example, the first client terminal can include one of a desktop computer, a workstation, a minicomputer, a laptop computer, a tablet computer, a personal digital assistant (PDAs), a smart mobile phone, and a smart watch. For still another example, the second client terminal can include one of a desktop computer, a workstation, a minicomputer, a laptop computer, a tablet computer, a personal digital assistant (PDAs), a smart mobile phone, and a smart watch.

For another example, the system can include a plurality of additional client terminals. Each of the plurality of additional client terminals can be configured to cause information regarding the auction lot available for live auction bidding to be shown on a display associated with the client terminal, and receive a signal indicative of an input to the client terminal. The input can be indicative of a bid being entered on the auction lot. Each of the plurality of additional client terminals can be configured to, in response to the receipt of the input, cause a signal to be transmitted to the second client terminal. The second client terminal can be configured to, in response to the receipt of the signal, cause a haptic notification to be provided to the auctioneer such that the auctioneer can receive a plurality of haptic notifications based on bids entered via any two or more of the first client terminal and the plurality of additional client terminals.

In another aspect, an auction method is provided that in one embodiment includes receiving at a client terminal worn by an auctioneer of a live auction an indication that a bid on an auction lot has been submitted by an offsite bidder, and, in response to receiving the indication, causing the client terminal to provide a haptic signal to the auctioneer to indicate that the bid has been submitted for the auction lot.

The method can have any number of variations. For example, the method can include varying the haptic signal based on a monetary amount of the bid as compared to a predetermined threshold monetary amount. For another example, the indication can be received at the client terminal directly from a second client terminal associated with the offsite bidder through which the offsite bidder submitted the bid. For yet another example, the indication can be received at the client terminal directly from a second client terminal associated with the auctioneer that received a prior indication from a third client terminal associated with the offsite bidder through which the offsite bidder submitted the bid. For still another example, the haptic signal can include at least one a vibration and an electronic tap. For yet another example, the second client terminal can include one of a smart mobile phone and a smart watch.

For another example, the method can include, in response to the bid on the auction lot having been submitted by the offsite bidder, causing at least one of an audible signal and a visible signal to be provided to the auctioneer to provide additional signaling to the auctioneer that the bid has been submitted by the offsite bidder for the auction lot. The client terminal can provide the at least one of an audible signal and a visible signal to the auctioneer, or a second client terminal associated with the auctioneer can provide the at least one of an audible signal and a visible signal to the auctioneer, the second client terminal being a separate device from the client terminal.

Non-transitory computer program products (i.e., physically embodied computer program products) are also provided that store instructions, which when executed by one or more processors of one or more computer systems, causes at least one processor to perform operations herein. Similarly, computer systems are also provided that can include one or more processors and one or more memories coupled to the one or more processors. Each of the one or more memories can temporarily or permanently store instructions that cause at least one processor to perform one or more of the operations described herein. In addition, methods can be implemented by one or more processors either within a single computer system or distributed among two or more computer systems. Such computer systems can be connected and can exchange data and/or commands or other instructions or the like via one or more connections, including but not limited to a connection over a network (e.g., the Internet, a wireless wide area network, a local area network, a wide area network, a wired network, etc.), via a direct connection between one or more of the multiple computer systems, etc.

BRIEF DESCRIPTION OF DRAWINGS

This invention will be more fully understood from the following detailed description taken in conjunction with the accompanying drawings, in which.

DETAILED DESCRIPTION

Figure 1:
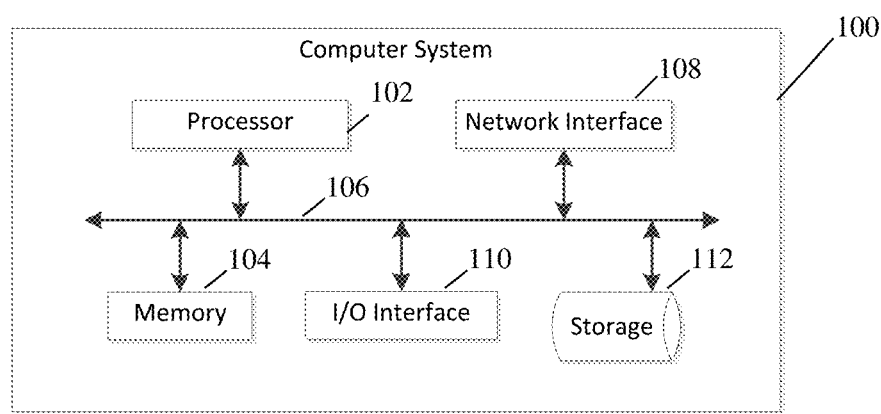
FIG. 1 is a schematic diagram of one embodiment of a computer system.

Certain exemplary embodiments will now be described to provide an overall understanding of the principles of the structure, function, manufacture, and use of the devices and methods described herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon.

Systems and methods are provided for providing auction bid notifications via wearable devices. In general, an auction system can be configured to provide an auctioneer of a live auction with a haptic notification of a bid having been made. The auctioneer may thus avoid prematurely closing an auction lot before all bids have been acknowledged and thereby help obtain maximum bid amount and/or help meet an auction's reserve price, the auctioneer may be incited to increase their efforts to elicit bids through, e.g., verbal persuasion, emphatic gestures, etc., based on frequency of received haptic notifications, and/or the auctioneer can receive a verified signal of a bid being made instead of having to rely on the auctioneer's skills of observation, which may become strained during the frenzy of a live auction and/or be undeveloped as a skill in the case of less experienced auctioneers.

A haptic signal (also referred to herein as a "haptic notification") indicative of a bid having been made can be provided to an auctioneer of a live auction in any of a variety of ways. For example, the haptic signal can include a vibration, e.g., a vibration of a smart phone using the phone's built-in vibration feature, or an electronic "tap" or "ping," e.g., a tap on a wrist using a smart watch's (such as an Apple Watch's) built-in haptic feature. The haptic notification may be more noticeable to an auctioneer than either a visual notification or an audible notification since it need not rely on a quiet enough environment for detection (unlike an audible sound) and need not rely on the auctioneer's eye being directed to a certain place (unlike a visual signal).

Providing a haptic signal to an auctioneer may allow the auctioneer to physically feel that a bid has been made and thus the auctioneer need not rely on auditory notice and/or visual notice of the bid having been made. An auctioneer's auditory and visual observations are typically very active during a live auction since the auctioneer must focus on auditory and visual observation of bidders on site with the auctioneer as well as focus on at least visual observation of paper and/or a display screen providing information regarding the auction lot and/or providing information regarding bids submitted by offsite bidders who are not on site with the auctioneer. In at least some cases these auditory and visual observations may be strained due to very crowded, very loud, and/or very busy auctions. The haptic notification provided to the auctioneer may thus relieve auctioneer strain by reducing the need for visual and/or auditory observation of a bid having been made, allow the auctioneer to maintain visual engagement with onsite bidders while receiving notice of offsite bidding, trigger the auctioneer to electronically acknowledge an offsite bidder's bid in a timely manner, and/or trigger the auctioneer to scan the room or other location where the auction is taking place to acknowledge an onsite bidder's bid in a timely manner.

In at least some live auctions, the number of bidders on site with the auctioneer can be particularly large and/or the site can have an unusual layout, which may require the auctioneer to spend a good amount of time scanning the room (or other location where the auction is taking place) to identify bids made by any of the onsite bidders. The auctioneer may thus less frequently check paper and/or a display screen providing information regarding the auction lot and/or providing information regarding bids submitted by offsite bidders who are not on site with the auctioneer than the auctioneer would like to check the paper and/or display screen under the auctioneer's usual preferences. The auctioneer may thus miss bids having been made by offsite bidders while his/her attention is devoted to onsite bidders. Providing haptic notification of all bids made, or providing haptic notification of only offsite bids made, may thus help the auctioneer identify bids even when the number of onsite bidders is particularly large and/or when the site has an unusual layout.

In an exemplary embodiment, the haptic signal can be provided to an auctioneer via a wearable device worn by the auctioneer. Even if an auctioneer does not currently use a wearable device capable of providing a haptic signal as part of his/her live auction process, such a wearable device can be easily incorporated into the auctioneer's live auction process (e.g., by the auctioneer wearing a smart watch, by the auctioneer clipping a smart mobile phone to a belt being worn by the auctioneer, etc.) so as to allow the haptic notification to be provided to the auctioneer.

The wearable device can be a separate device from a client terminal associated with the auctioneer and that the auctioneer can use to generally track bids and receive information about an auction lot (e.g., current bid, auction lot description, etc.) currently open for bids. The auctioneer's client terminal user interface thus need not be modified, which may help reduce costs by not requiring upgrade and/or replacement of the client terminal's software and/or the client terminal, and/or may maintain the auctioneer's familiarity of and accordant ease of using the client terminal.

In at least some embodiments, a haptic signal of a bid having been made can be configured to indicate a relative price of the bid. The haptic signal can thus be configured to provide an indication to the auctioneer of bidding interest in the auction lot currently open for bids. The auctioneer may thus avoid prematurely closing an auction lot before all bids have been able to be made and thereby help obtain maximum bid amount and/or help meet an auction's reserve, and/or the auctioneer may be incited to increase their efforts to elicit bids through, e.g., verbal persuasion, emphatic gestures, etc., based on the haptic signal (e.g., when bidding interest is lower than desired). For example, the haptic signal can increase in duration (e.g., a longer vibration, a longer series of vibrations, a longer series of "tap," a longer lasting single "tap," etc.) and/or in strength (e.g., a more forceful vibration, a more forceful "tap," etc.) the higher the bid. Correspondingly, the lower the duration and/or the strength of the haptic signal, the lower the bid.

In at least some embodiments, a haptic signal of a bid having been made can be provided to an auctioneer in addition to one or both of a visual signal and an auditory signal indicative of the bid having been made. The additional visual signal and/or audible signal may help ensure that an auctioneer receives notification of the bid and/or provide redundancy in the unlikely case of haptic device failure.

A notification as a visual signal can be in the form of an icon, symbol, text, and/or other visible information on a display screen on which the auctioneer is receiving information regarding an auction lot. In many modern live auctions, auctioneers have a display screen (e.g., a display of a desktop computer, a display of a laptop computer, a display of a tablet computer, a display of a smart phone, etc.) on which information regarding at least the current auction lot is available, such as auction lot identifier (e.g., number, letter, code, etc.), starting bid price, current bid price, auction lot description, identity of seller or consigner, etc. The visual notification can be integrated onto this display screen such that an auctioneer's traditional display screen including auction information can be upgraded or otherwise retrofitted to include the visual notification. Even if an auctioneer does not currently use a display screen as part of his/her live auction process, a display screen can be easily incorporated into the auctioneer's live auction process (e.g., by the auctioneer holding a smart phone, having a display screen mounted on a podium at which the auctioneer is standing, etc.) so as to allow the visual notification to be provided to the auctioneer via display screen.

A notification as an audible sound can be in the form of a beep, a series of beeps, a spoken word announcement, and/or other sound directed to the auctioneer. The audible sound can be directed to the auctioneer by, for example, being provided through an earpiece or through headphones worn by the auctioneer, which may allow the sound to be heard by the auctioneer but not by others and thus not be a distraction to others and/or not provide undue advantage to bidders within earshot of the audible sound.

A bidder can trigger the haptic notification to be provided to the auctioneer (and, if being provided, the visual signal and/or audible signal). The notification process can be invisible to the bidder. The bidder's bidding process thus can remain uninterrupted from the bidder's perspective, which may help preserve auction flow and/or prevent bidder distraction from bid-making. The notification can be configured to be automatically provided to the auctioneer in response to the bidder submitting the bid. In an exemplary embodiment, an offsite bidder can trigger the haptic notification to be provided to the auctioneer by the offsite bidder submitting a bid through the auction system's usual bidding process, e.g., by the bidder electronically submitting the bid via a client terminal such as by clicking a "submit" button or by clicking on or selecting another item configured to trigger formal entry of a bid. The auctioneer may thus receive an indication of the offsite bidder's bid without the auctioneer having to listen for any audio signal indicative of an offsite bid being made and without the auctioneer having to divert their eyes to view a display that shows bids by offsite bidders.

The systems and methods described herein can be used in connection with a live auction auctioning any one or more types of goods and/or services. For example, the live auctions can include auctions for art, real estate, collectibles, cars, boats, livestock, coins and currencies, antiquities, maps, books, posters, entertainment memorabilia, record albums and other types of music, musical instruments, electronics, clothing, jewelry, furniture, glassware, tableware, fine metals, and/or wine.

The systems and methods disclosed herein can be implemented using one or more computer systems. FIG. 1 illustrates one exemplary embodiment of a computer system 100. As shown, the computer system 100 can include one or more processors 102 which can control the operation of the computer system 100. The processor(s) 102 can include any type of microprocessor or central processing unit (CPU), including programmable general-purpose or special-purpose microprocessors and/or any one of a variety of proprietary or commercially available single or multi-processor systems. The computer system 100 can also include one or more memories 104, which can provide temporary storage for code to be executed by the processor(s) 102 or for data acquired from one or more users, storage devices, and/or databases. The memory 104 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system 100 can be coupled to a bus system 106. The illustrated bus system 106 is an abstraction that represents any one or more separate physical busses, communication lines/interfaces, and/or multi-drop or point-to-point connections, connected by appropriate bridges, adapters, and/or controllers. The computer system 100 can also include one or more network interface(s) 108, one or more input/output (I/O) interface(s) 110, and one or more storage device(s) 112.

The network interface(s) 108 can enable the computer system 100 to communicate with remote devices, e.g., other computer systems, over a network, and can be, for example, remote desktop connection interfaces, Ethernet adapters, and/or other local area network (LAN) adapters. The I/O interface(s) 110 can include one or more interface components to connect the computer system 100 with other electronic equipment. For example, the I/O interface(s) 110 can include high speed data ports, such as USB ports, 1394 ports, Wi-Fi, Bluetooth, etc. Additionally, the computer system 100 can be accessible to a human user, and thus the I/O interface(s) 110 can include displays, speakers, keyboards, pointing devices, and/or various other video, audio, or alphanumeric interfaces. The storage device(s) 112 can include any conventional medium for storing data in a non-volatile and/or non-transient manner. The storage device(s) 112 can thus include a memory that holds data and/or instructions in a persistent state, i.e., the value is retained despite interruption of power to the computer system 100. The storage device(s) 112 can include one or more hard disk drives, flash drives, USB drives, optical drives, various media cards, diskettes, compact discs, and/or any combination thereof and can be directly connected to the computer system 100 or remotely connected thereto, such as over a network. In an exemplary embodiment, the storage device(s) can include a tangible or non-transitory computer readable medium configured to store data, e.g., a hard disk drive, a flash drive, a USB drive, an optical drive, a media card, a diskette, a compact disc, etc.

The elements illustrated in FIG. 1 can be some or all of the elements of a single physical machine. In addition, not all of the illustrated elements need to be located on or in the same physical machine, at least in the case of external electronic devices. Exemplary computer systems include conventional desktop computers, workstations, minicomputers, laptop computers, tablet computers, personal digital assistants (PDAs), smart mobile phones, smart watches, and the like.

The computer system 100 can include a web browser for retrieving web pages or other markup language streams, presenting those pages and/or streams (visually, aurally, or otherwise), executing scripts, controls and other code on those pages/streams, accepting user input with respect to those pages/streams (e.g., for purposes of completing input fields), issuing Hypertext Transfer Protocol (HTTP) requests with respect to those pages/streams or otherwise (e.g., for submitting to a server information from the completed input fields), and so forth. The web pages or other markup language can be in HyperText Markup Language (HTML) or other conventional forms, including embedded Extensible Markup Language (XML), scripts, controls, and so forth. The computer system 100 can also include a web server for generating and/or delivering the web pages to client computer systems.

In an exemplary embodiment, the computer system 100 can be provided as a single unit, e.g., as a single server, as a single tower, contained within a single housing, etc. Systems and methods can thus be provided as a singular unit configured to display the various user interfaces and capture the data described herein. The singular unit can be modular such that various aspects thereof can be swapped in and out as needed for, e.g., upgrade, replacement, maintenance, etc., without interrupting functionality of any other aspects of the system. The singular unit can thus also be scalable with the ability to be added to as additional functionality is desired and/or improved upon.

While some embodiments are described herein in the context of web pages, it will be appreciated that in other embodiments, one or more of the described functions can be performed without the use of web pages and/or by other than web browser software. A computer system can also include any of a variety of other software and/or hardware components, including by way of example, operating systems and database management systems. Although an exemplary computer system is depicted and described herein, it will be appreciated that this is for sake of generality and convenience. In other embodiments, the computer system may differ in architecture and operation from that shown and described here.

Figure 2:
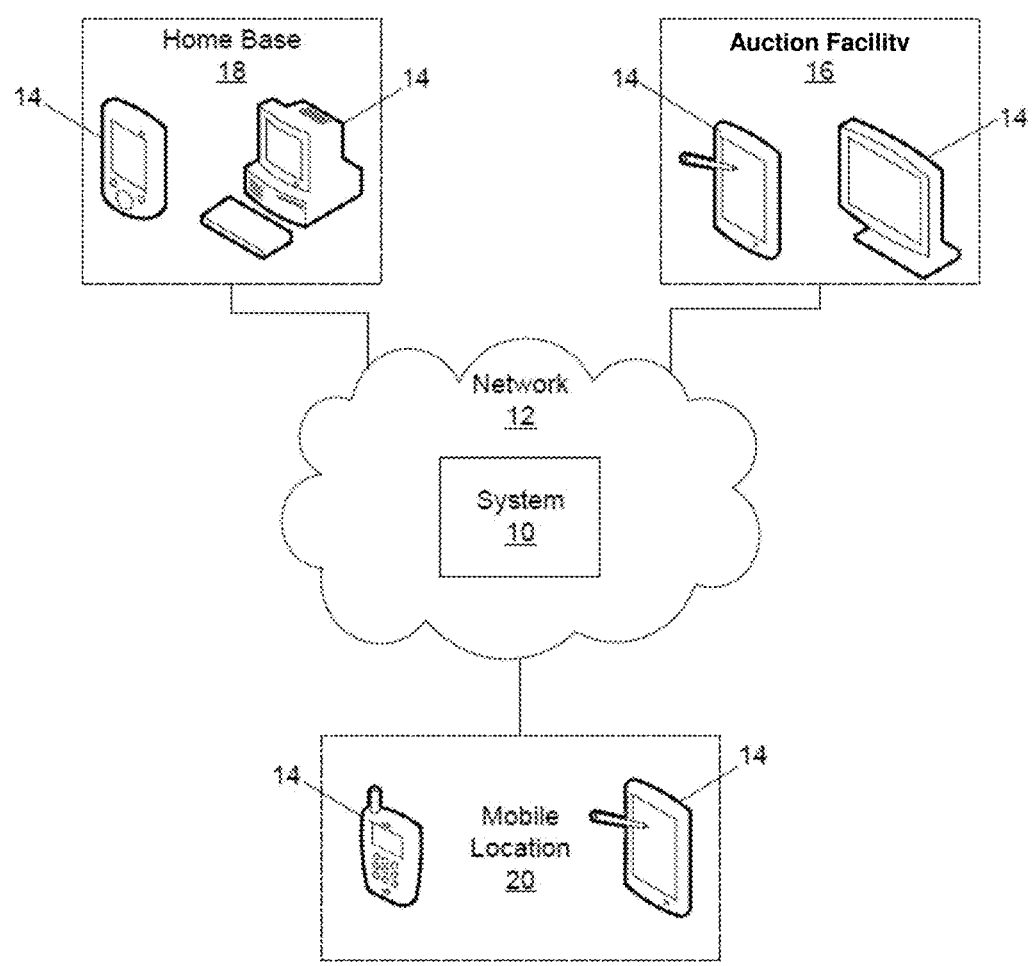
FIG. 2 is a schematic diagram of one embodiment of an auction system.

FIG. 2 is a schematic block diagram of one exemplary embodiment of an auction system 10. The system 10 can be implemented using one or more computer systems of the type described above, and in particular using one or more web pages which can be viewed, manipulated, and/or interacted with using such computer systems. The system 10 can thus be implemented on a single computer system, or can be distributed across a plurality of computer systems. The system 10 can include one or more databases, which can be stored on and accessed by computer systems.

Any of a variety of users can access, interact with, control, etc. the auction system 10 from any of a variety of locations. For example, as shown in the embodiment illustrated in FIG. 2, the auction system 10 can be accessible over a network 12 (e.g., over the Internet via cloud computing) from any number of client stations 14 in any number of locations such as an auction facility 16 (e.g., a site such as an auction house where a live auction is occurring, etc.), a home base 18 (e.g., an auction bidder's home or office), a mobile location 20, and so forth. The system 10 is shown in this illustrated embodiment as being at a separate location from the auction facility 16, but in some embodiments, the system 10 can be located at the auction facility 16. The client station(s) 14 can access the system 10 through a wired and/or wireless connection to the network 12. In an exemplary embodiment, at least some of the client terminal(s) 14 can access the system 10 wirelessly, e.g., through Wi-Fi connection(s), which can facilitate accessibility of the system 10 from almost any location in the world. As shown in FIG. 2, the auction facility 16 includes client stations 14 in the form of a tablet and a computer touch screen, the home base 18 includes client stations 14 in the form of a mobile phone having a touch screen and a desktop computer, and the mobile location 20 includes client stations 14 in the form of a tablet and a mobile phone, but the auction facility 16, the home base 18, and the mobile location 20 can include any number and any type of client stations. In an exemplary embodiment, the system 10 can be accessible by a client terminal via a web address and/or a client application (generally referred to as an "app").

It will be appreciated that the system 10 can include security features such that the aspects of the system available to any particular user can be determined based on the identity of the user and/or the location from which the user is accessing the system. To that end, each user can have a unique username, password, and/or other security credentials to facilitate access to the system 10. The received security parameter information can be checked against a database of authorized users to determine whether the user is authorized and to what extent the user is permitted to interact with the system, view information stored in the system, and so forth. Exemplary examples of users who can be permitted to access the system 10 include potential auction bidders, auctioneers, and auction house administrators.

Data related to the systems and methods described herein can be displayed in a variety of ways. The data can be displayed via a GUI or display screen of a computer system. The screen can show a variety of different types of information, and the information can be displayed in any of a variety of ways.

Figure 3:
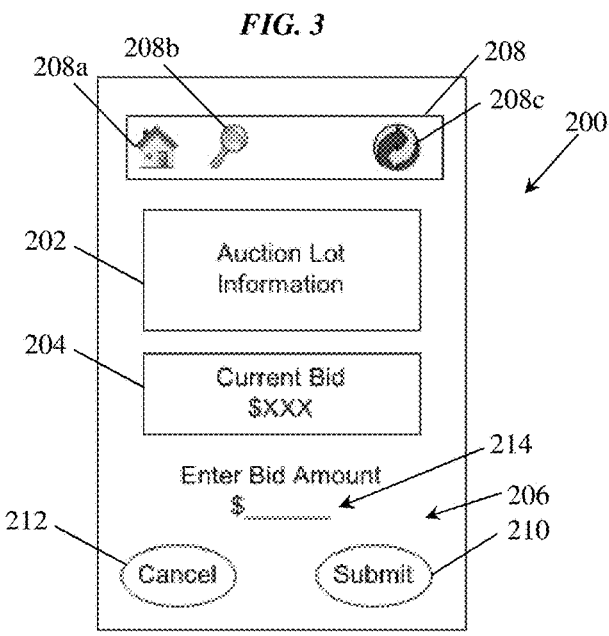
FIG. 3 is a diagram of one embodiment of an auction bid screen.
Figure 4:
FIG. 4 is a perspective view of one embodiment of a smart watch.

FIGS. 3 and 4 illustrate embodiments of screens including data related to live auction bidding that can each be configured to be provided by an auction system. The information shown on these screens are examples only, and any of the screens can include more information or less information. The screens discussed below with respect to FIGS. 3 and 4 are touch screens, but similar screens can be provided on other types of displays. The screens of FIGS. 3 and 4 are examples only and can show a variety of different types of information, and the information can be displayed in any of a variety of ways.

FIG. 3 illustrates an embodiment of an auction bid screen 200 configured to display information regarding a live auction to a bidder. (The term "bidder" is used herein to refer to users who have actually placed bids in an auction as well as to users who may place a bid in the auction but who may or may not end up doing so in the course of the auction.) The auction bid screen 200 can be configured to be displayed on a display of a client terminal, e.g., computer system, associated with the bidder (or a user authorized to bid on behalf of the bidder). As mentioned above, the bidder (or the user authorized to bid on behalf of the bidder) can be required to login to verify identity and/or location prior to being given access to the auction bid screen 200. The auction bid screen 200 can be configured to be displayed on the display of the bidder's associated computer system via web address so as to be shown on the display as a web page or via a program or an app installed on the computer system.

In general, the auction bid screen 200 can be configured to allow the bidder (or the user authorized to bid on behalf of the bidder) to submit a bid for the current auction lot. As in this illustrated embodiment, the auction bid screen 200 can include auction lot information 202, current bid information 204, a bid entry portion 206, and a menu 208. The auction lot information 202 can include data regarding the current auction lot available for bids, such as auction lot identifier, starting bid price, auction lot description, image of the auctioned good(s), name and/or logo of the auction house offering the auction lot, etc. The auction lot information 202 can be configured to automatically update in real time to reflect the currently active auction lot, e.g., the auction lot that is currently open and accepting bids or, in the case of no auction lot being currently active, the next auction lot that will be opened for bidding.

The current bid information 204 can show the current bid price for the auction lot identified by the auction lot information 202. If no auction lot is currently active, the current bid information 204 may be absent from the screen 200, may show "none," "not applicable," or other appropriate message, or may be dimmed or otherwise indicated as being inactive due to not auction lots currently being open for bidding. The current bid information 204 in this illustrated example is shown in dollars, but any other currency can be shown instead or in addition.

The menu 208 can include one or more options selectable by a user (e.g., by the bidder or a user authorized to bid on behalf of the bidder) to access information other than that shown on the auction bid screen 200. The menu 208 can include any number of options, which in this illustrated embodiment include selectable icons. In this illustrated embodiment, the selectable icons include a home icon 208a configured to, upon selection, display a home page on the display screen, a search icon 208b configured to, upon selection, allow the bidder (or user authorized to bid on behalf of the bidder) to search auction lots offered in the auction), and a refresh icon 208c configured to, upon selection, manually refresh the auction bid page 200. The auction bid page 200 can, as will be appreciated, be configured to automatically refresh on a predetermined schedule. The bidder (or user authorized to bid on behalf of the bidder) may, however, desire to refresh more frequently.

The bid entry portion 206 can be configured to allow the bidder (or the user authorized to bid on behalf of the bidder) to enter a bid amount in a provided space 214, e.g., by typing numbers on a keyboard of the bidder's associated client terminal, by using voice command functionality of the bidder's associated client terminal, etc. The entered bid may then be formally submitted as a bid by selecting a submit icon 210. The bidder (or the user authorized to bid on behalf of the bidder) may then continue monitoring the auction of the current auction lot and may submit one or more additional bids if desired based on changes in the current auction price reflective of the bidder not being the high bidder.

Alternatively, instead of submitting a bid via the auction bid screen 200, the bidder (or the user authorized to bid on behalf of the bidder) can exit the auction bid screen 200 without submitting a bid (with or without having entered a bid amount into the provided space 214) by selecting a cancel icon 212. The submit and cancel icons 210, 212 in this illustrated embodiment include selectable oval-shaped buttons, but submission and cancellation functionality can be provided on the auction bid screen 200 in any of a number of other ways, such as by being selectable symbols, selectable text, etc.

The user's submission of the bid, e.g., selection of the submit icon 210, whether the user be the bidder himself/herself or a user authorized to bid on behalf of the bidder, can be configured to trigger the client terminal associated with the display showing the auction information screen 200 (e.g., a tablet computer having a display screen showing the auction information screen 200, a desktop computer showing the auction information screen 200 on a monitor, a smart phone having a display screen showing the auction information screen 200, etc.) to transmit a signal to a client terminal associated with the auctioneer of the auction. This transmission can be automatic without any other particular action being taken by the user to cause the signal's transmission.

The client terminal associated with the auctioneer can include a client terminal being used by the auctioneer such that the bidder's associated client terminal directly transmits a signal to the auctioneer's client terminal over a network without receipt by any intervening client terminals. In another embodiment, the bidder's associated client terminal can be configured to transmit a signal to a client terminal associated with a provider of the auction, e.g., the auction house providing the auction, which can be configured to transmit the received signal to the auctioneer's associated client terminal. The auction provider's associated client terminal can thus be configured as a clearinghouse for the auctioneer's associated client terminal. The auction provider's associated client terminal receiving the signal prior to the auctioneer's associated client terminal receiving the signal may help preserve bidder anonymity to the auctioneer, may allow bid interest to be authenticated as being from an authorized bidder by the clearinghouse before being provided to the auctioneer as an accurate indication of real interest from a real bidder in the current auction lot, and/or may allow the clearinghouse to store records regarding received bid interest from offsite bidders to help analyze auction habits of bidders after the auction to help organize, advertise, and/or maximize effectiveness of future auctions.

Figure 5:
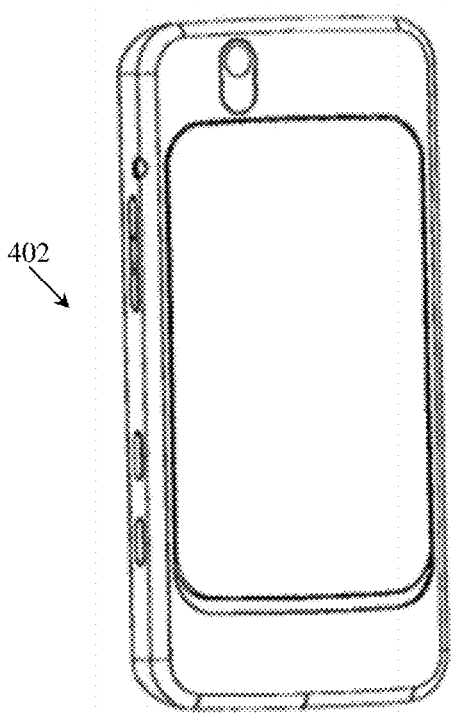
FIG. 5 is a perspective view of one embodiment of a smart mobile phone.

The client terminal associated with the auctioneer can have a variety of configurations, as discussed above. In an exemplary embodiment, the client terminal associated with the auctioneer that receives the signal (either directly from the bidder's associated client terminal or indirectly through one or more clearinghouses) and that provides a haptic signal to the auctioneer in response thereto can include a wearable device. FIG. 4 illustrates one embodiment of such a wearable device in the form of a smart watch 400 configured to be worn on a wrist. FIG. 5 illustrates another embodiment of a such a wearable device in the form of a smart mobile phone 402 configured to be clipped to a belt of a user or to be placed in a pocket of a user's clothes. As discussed above, the wearable device may in at least some embodiments not be the only client terminal associated with the auctioneer that receives the signal (either directly from the bidder's associated client terminal or indirectly through one or more clearinghouses), such as in the case of an auctioneer using a display to show auction information thereto including visual notifications of bids made and/or using a device configured to provide audible notifications of bids made to the auctioneer.

Figure 6:
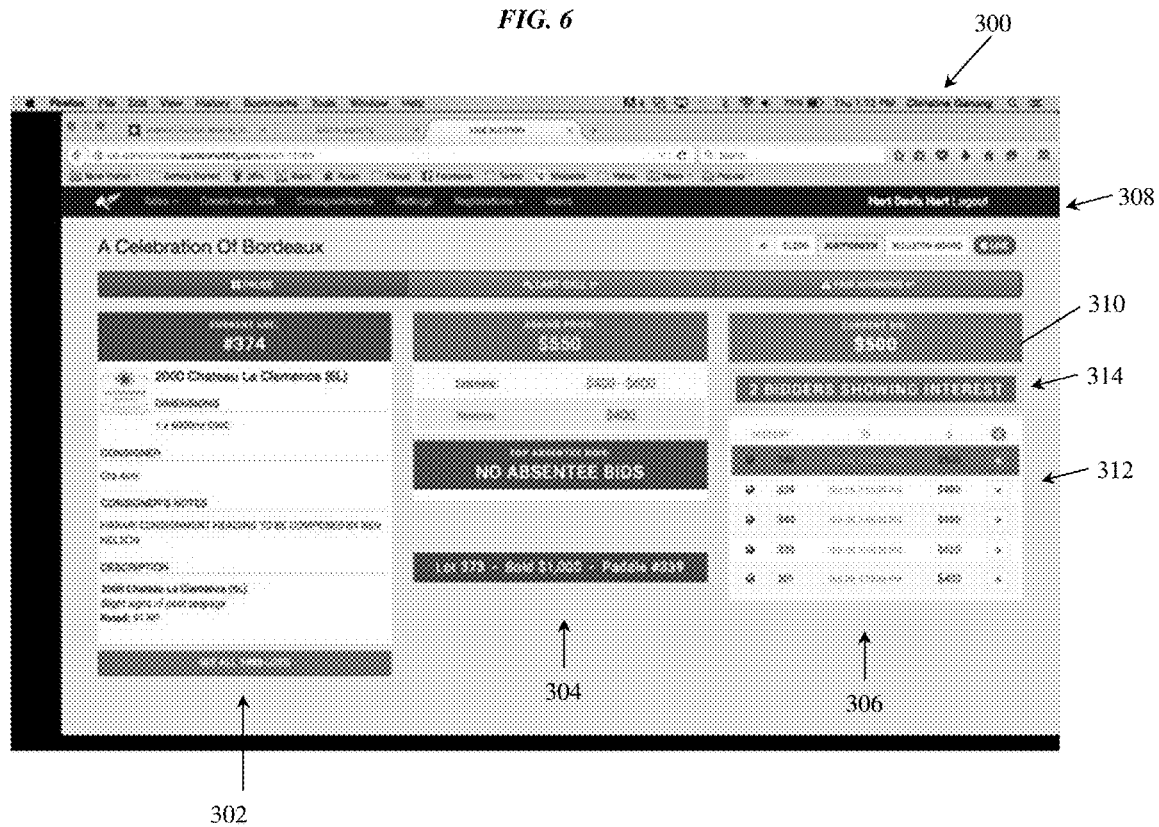
FIG. 6 a diagram of one embodiment of an auction lot information screen.

FIG. 6 illustrates an embodiment of an auction lot information screen 300 configured to display information regarding an auction lot of live auction to an auctioneer. The auction lot information screen 300 can be configured to be displayed on a display of a client terminal, e.g., computer system, associated with an auctioneer of a live auction. As mentioned above, the auctioneer can be required to login to verify identity and/or location prior to being given access to the auction lot information screen 300. The auction lot information screen 300 can be configured to be displayed on the display of the auctioneer's associated computer system via web address so as to be shown on the display as a web page or via a program or an app installed on the computer system.

As in this illustrated embodiment, the auction lot information screen 300 can include current (active) auction lot information 302, current lot bid information 304, current lot bid interest information 306, and a menu 308. The current auction lot information 302 can include data regarding the current auction lot available for bids, such as auction lot identifier ("#374" in this illustrated embodiment), starting bid price, auction lot description, image of the auctioned good(s), name and/or logo of the auction house offering the auction lot, name of the consigner of the auction lot, information about the auction lot from the consigner, etc.

The current lot bid information 304 can show information related to bids for the current auction lot, such as the lot's asking price, the lot's estimate, the lot's reserve price, and whether any absentee bids exist for the lot. The current lot bid information 304 can include information for any one or more other auctions, such as the immediately preceding auction (as in this illustrated embodiment), other auctions by the same consigner, and/or related lots in the auction.

The menu 308 can include one or more options selectable by a user (e.g., by the auctioneer) to access information other than that shown on the auction lot information screen 300. The menu 308 can include any number of options, which in this illustrated embodiment include selectable text of "Sales," "Create New Sale," "Consigned Items," "Settings," "Registrations," "Users," and "Logout."

The current lot bid interest information 306 can include information related to bidding on the current auction lot. The current lot bid interest information 306 can include the current bid price 310 for the auction lot, can include historical bid information 312 for the item(s) in the current auction lot, and can include information 314 indicating whether any notifications have been received by the auctioneer's associated client terminal, e.g., the client terminal associated with the display showing the screen 300, indicating that a bid has been made on the current auction lot. In other words, the current lot bid interest information 306 can include information related to selectors selected by bidders and those users authorized to bid on behalf of bidders. As in this illustrated embodiment, the information 314 indicating whether any notifications have been received can indicate a number of bidders having triggered notifications to be received, which is two in this illustrated embodiment. The auctioneer may thus easily determine from viewing the screen 300 that interest in the current auction lot exists and that the auction lot should perhaps not yet be closed and/or bid encouragement should be provided. However, as discussed herein, the auctioneer need not rely on the notifications on the screen 300, and indeed need not monitor the notification information 314 at all if it is the auctioneer's preference, since the auctioneer will have received a haptic signal for each of the bids made. In other words, in this illustrated embodiment, the auctioneer receives two types of bid notification signals, a haptic signal and a visual signal. In other embodiments, as described herein, the auctioneer can receive the haptic signal only without the visual signal (e.g., with the notification information 314 being present on the screen 300) and without an auditory signal, can receive an auditory signal in addition to the haptic and visual signals, or can receive the haptic signal and an auditory signal without receiving the visual signal.

The information 314 indicating whether any notifications have been received can be in a different color than other information on the screen 300, which may help the information 314 stand out and be noticed by the auctioneer, as in this illustrated example in which the information 314 has a yellow border, where yellow is otherwise not present on the screen 300. In addition to or in alternative to the information 314 being in a different color, the information 314 and/or a mark nearby or a border therearound may flash on the screen 300, which may help the information 314 stand out and be noticed by the auctioneer. In addition to or in alternative to the information 314 being in a different color or having a flash associated therewith on the screen 300, an audible sound and/or a haptic signal may be provided to the auctioneer upon receipt of each of the notifications, as discussed above.

Figure 7:
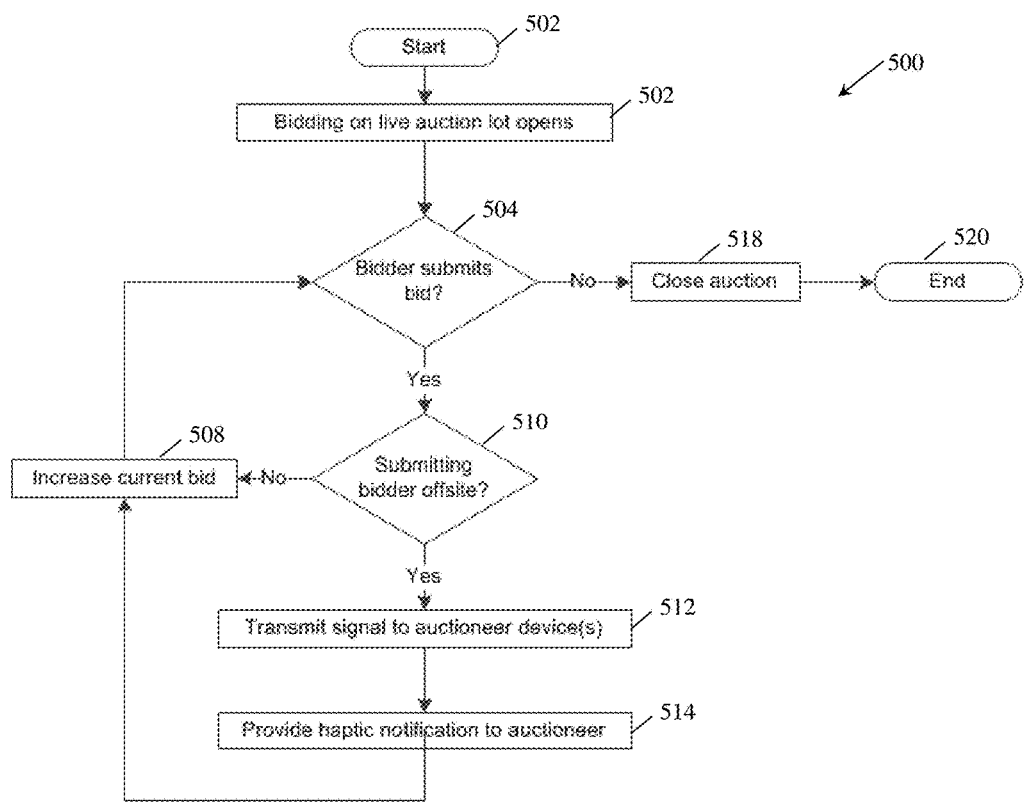
FIG. 7 is a flowchart of one embodiment of a live auction bidding process for an auction lot.

FIG. 7 illustrates an embodiment of a method 500 of using an auction system configured to provide auction bid notifications via a wearable device worn by an auctioneer. The method 500 can start 502 with bidding on a live auction lot opening 504. The bidding can be opened 504 by an auctioneer in any of a variety of ways, as will be appreciated, such as by verbally announcing the opening 504 of bids on the auction lot and by electronically indicating the opening 504 of bids via a client terminal associated with the auctioneer. Onsite bidders can be made aware of the bid opening 504 in any of a variety of ways, as will be appreciated, such as by visually and/or audibly observing the auctioneer on site therewith. Offsite bidders can be made aware of the bid opening 504 in any of a variety of ways, as will be appreciated, such as by each of the bidders' associated client terminals receiving a signal from the auctioneer's associated client terminal (either directly or via a clearinghouse) indicative of bid opening 504 that causes notice of the bid opening 504 to be provided to the bidders via their respective associated client terminals.

With bids open 504 on the auction lot, the auctioneer can monitor the submission 506 of bids by onsite bidders and bids by offsite bidders. If a bid is submitted 506 by an onsite bidder 510, e.g., by verbal bid and/or by raised bidding paddle, the auctioneer can accept the bid and raise 508 the current price of the auction lot in accordance with the bid and continue monitoring for the submission of bids. As will be appreciated, the auctioneer can visually and/or audibly detect onsite bidding. Thus, as in this illustrated embodiment, none of a haptic notification, electronic visual notification, and electronic audible notification need be provided to the auctioneer in order for the auctioneer to recognize that an onsite bid 510 has been submitted 506. In at least some other embodiments, however, any one or more of a haptic notification, electronic visual notification, and electronic audible notification can be provided to the auctioneer to indicate the submission 506 of an onsite bid 510, which may help ensure that the auctioneer acknowledges the onsite bid 510 in a timely manner. For example, a room or other location in which an auction is being conducted may have one or more bid watchers present who watch for onsite bids and manually cause a light to be illuminated to indicate to the auctioneer that an onsite bid has been made and/or manually cause a buzzer to beep to indicate to the auctioneer that an onsite bid has been made.

If a bid is submitted 506 by an offsite bidder 510, e.g., by electronically submitted bid via the bidder's associated client terminal, the offsite bid submission 506 can trigger a signal to be transmitted 512 from the bidder, e.g., from a client terminal associated with the bidder, to the auctioneer, e.g., to a client terminal associated with the auctioneer (either directly thereto or indirectly thereto via one or more clearinghouses). As mentioned above, the transmission 512 of the signal can be an automatic consequence of the bid submission 506. In response to receipt of the signal, the auctioneer can be provided 514 with a haptic notification indicating that a bid has been submitted 506 by an offsite bidder. The client terminal associated with the auctioneer that receives the signal can be the same device that provides 514 the haptic notification to the auctioneer. Additionally or alternatively, the client terminal that receives the signal can, in response to the receipt of the signal, cause a second client terminal associated with the auctioneer to provide 514 the haptic notification to the auctioneer, such as by transmitting a second signal to the second client terminal. The auctioneer may thus be able to receive more than one haptic notification, thereby increasing chances that the auctioneer will not accidentally overlook the submitted 506 offsite bid 510. In an exemplary embodiment, the auctioneer is provided 514 with only one haptic notification (which, as discussed above, may include more than one discrete notification, such as in the case of a series of vibrations), which may help reduce auctioneer distraction.

Figure 8:
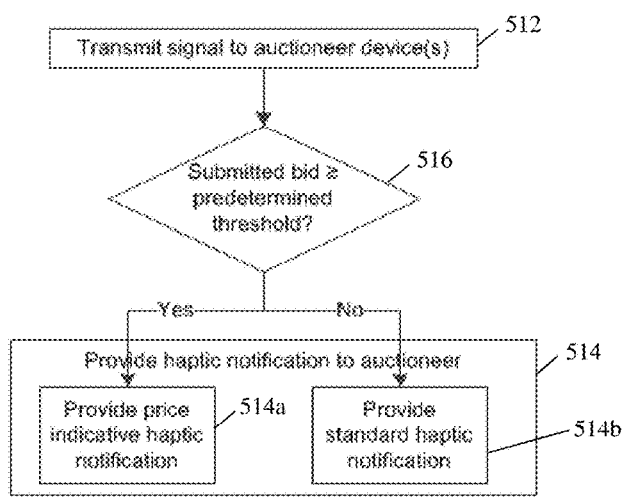
FIG. 8 is a flowchart of one embodiment of a portion of the live auction bidding process of FIG. 7.

In at least some embodiments, the provided 514 haptic notification can vary based on the bid as compared to a predetermined threshold. FIG. 8 illustrates one embodiment of a process in which the provided 514 haptic notification varies based on the bid as compared to a predetermined threshold. If the submitted offsite bid is for a monetary amount that is determined 516 to be or equal to or greater than a predetermined threshold (e.g., a predetermined monetary amount such as a reserve price for the auction lot, a maximum estimated price of the auction lot, a price that is twice a maximum estimated price of the auction lot, a highest previous auction selling price for a similar auction lot, a highest price for any auction lot previously auctioned in the auction, etc.), then a "special" haptic notification can be provided 514a to the auctioneer. The "special" haptic notification can be configured to provide an indication to the auctioneer of bidding interest in the auction lot currently open 504 for bids, as discussed above. If the submitted offsite bid is for a monetary amount that is determined 516 to be less than the predetermined threshold, then a "standard" haptic notification can be provided 514b to the auctioneer. The "standard" haptic notification can be, for example, a default haptic notification setting of the client terminal providing the haptic notification or, for another example, a pre-programmed haptic notification setting selected by the auctioneer prior to the start of the auction.

Referring again to FIG. 7, although not shown in the illustrated method 500, one or both of an audible notification and a visible notification can be provided to the auctioneer in response to the receipt of the transmitted 512 signal. The client terminal associated with the auctioneer that receives the signal can be the same device that provides the audible notification and/or visible notification to the auctioneer. Additionally or alternatively, the client terminal that receives the signal can, in response to the receipt of the signal, cause another client terminal (which may or may not be the same client terminal as the second client terminal that may provide 514 the haptic notification to the auctioneer) associated with the auctioneer to provide the audible notification and/or visible notification to the auctioneer, such as by transmitting a signal thereto.

Having been made aware of the offsite bid 510 through the haptic notification (and/or through an audible notification and/or a visual notification, if provided to the auctioneer), the auctioneer can accept the offsite bid and raise 508 the current price of the auction lot in accordance with the bid and continue monitoring for the submission of bids.

Although not shown in the illustrated method 500, at least some auction lots may have one or more absentee bids associated therewith, and the auctioneer can increase 508 the current price of the auction lot according to the absentee bid(s), as will be appreciated.

If no bids have been submitted 506, or when bids have ceased being submitted 506, bidding can be closed 518 by the auctioneer, as will be appreciated, with the method 500 then ending 520. The method 500 may then repeat with one or more additional auction lots being sequentially opened for bidding.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An auction system, comprising:
a first client terminal associated with a bidder and including a first display, a first memory storing first instructions, and a first processor configured to
execute the stored first instructions to cause first information regarding an auction lot available for live auction bidding to be shown on the first display, and
receive a first signal indicative of a first input by a user to the first client terminal, the first input being indicative of the user entering a bid for the auction lot; and
a second client terminal associated with an auctioneer and configured to provide a haptic signal;
wherein the first processor is configured to, in response to the receipt of the first input, cause a second signal to be transmitted to the second client terminal;
wherein the second client terminal is configured to, in response to receipt of the second signal, provide the haptic signal to the auctioneer to indicate that the bid has been submitted for the auction lot; and
wherein the haptic signal can increase in duration and/or in strength the higher the bid.

2. The system of claim 1, wherein the second client terminal receives the second signal, provides the haptic signal to the auctioneer, and is configured to be worn by the auctioneer.

3. The system of claim 1, further comprising a third client terminal associated with the auctioneer, the third client terminal being configured to receive the second signal and, in response to the receipt of the second signal at the third client terminal, to cause the second client terminal to provide the haptic signal to the auctioneer, the second client terminal being configured to be worn by the auctioneer.

4. The system of claim 1, wherein the haptic signal includes at least one a vibration and an electronic tap.

5. The system of claim 1, wherein the second client terminal is configured to, in response to receipt of the second signal, cause at least one of an audible signal and a visible signal to be provided to the auctioneer to provide additional signaling to the auctioneer that the bid has been submitted for the auction lot.

6. The system of claim 1, wherein the first client terminal includes an input/output device configured to receive the first input thereto.

7. The system of claim 1, further comprising a plurality of additional client terminals, each of the plurality of additional client terminals being configured to
cause information indicating a current price of the auction lot available for live auction bidding to be shown on a display associated with the client terminal,
receive a signal indicative of an input to the client terminal, the input being indicative of a bid being entered on the auction lot having the current price, and
in response to the receipt of the input, cause a signal to be transmitted to the second client terminal;
wherein the second client terminal is configured to, in response to the receipt of the signal, cause a haptic notification to be provided to the auctioneer such that the auctioneer can receive a plurality of haptic notifications based on bids for the auction lot having the current price entered via any two or more of the first client terminal and the plurality of additional client terminals.

8. The system of claim 1, wherein the first client terminal includes a first network interface configured to facilitate electronic communication over a network, and the second client terminal includes a second network interface configured to facilitate electronic communication over the network.

9. The system of claim 1, wherein the first client terminal includes one of a desktop computer, a workstation, a minicomputer, a laptop computer, a tablet computer, a personal digital assistant (PDAs), a smart mobile phone, and a smart watch.

10. The system of claim 1, wherein the second client terminal includes one of a desktop computer, a workstation, a minicomputer, a laptop computer, a tablet computer, a personal digital assistant (PDAs), a smart mobile phone, and a smart watch.

11. An auction method, comprising:
receiving at a client terminal worn by an auctioneer of a live auction an indication that a bid on an auction lot has been submitted by an offsite bidder; and
in response to receiving the indication, causing the client terminal to provide a haptic signal to the auctioneer to indicate that the bid has been submitted for the auction lot, wherein the haptic signal can increase in duration and/or in strength the higher the bid.

12. The method of claim 11, further comprising varying the haptic signal based on a monetary amount of the bid as compared to a predetermined threshold monetary amount.

13. The method of claim 11, wherein the indication is received at the client terminal directly from a second client terminal associated with the offsite bidder through which the offsite bidder submitted the bid.

14. The method of claim 11, wherein the indication is received at the client terminal directly from a second client terminal associated with the auctioneer that received a prior indication from a third client terminal associated with the offsite bidder through which the offsite bidder submitted the bid.

15. The method of claim 11, further comprising, in response to the bid on the auction lot having been submitted by the offsite bidder, causing at least one of an audible signal and a visible signal to be provided to the auctioneer to provide additional signaling to the auctioneer that the bid has been submitted by the offsite bidder for the auction lot.

16. The method of claim 15, wherein the client terminal provides the at least one of an audible signal and a visible signal to the auctioneer.

17. The method of claim 15, wherein a second client terminal associated with the auctioneer provides the at least one of an audible signal and a visible signal to the auctioneer, the second client terminal being a separate device from the client terminal.

18. The method of claim 11, wherein the haptic signal includes at least one a vibration and an electronic tap.

19. The method of claim 11, wherein the second client terminal includes one of a smart mobile phone and a smart watch.

20. The system of claim 1, wherein the second client terminal is configured to, after providing the haptic signal, receive a third signal indicative of an input by the auctioneer accepting the bid submitted for the auction lot, thereby increasing a current price for the auction lot.

21. The method of claim 11, wherein the bid is for the auction lot having a current price; and
the method further comprises:
receiving at the client terminal a second indication that a second bid on the auction lot having the current price has been submitted by a second offsite bidder;

in response to receiving the second indication, causing the client terminal to provide a signal to the auctioneer to indicate that the second bid has been submitted for the auction lot; and receiving at the client terminal an indication that either the bid or the second bid has been accepted by the auctioneer so as to increase the current price of the auction lot.

\* \* \* \* \*